(12) United States Patent
Kim et al.

(10) Patent No.: US 8,717,148 B2
(45) Date of Patent: May 6, 2014

(54) METHOD FOR CONTROLLING EXTERNAL DEVICE AND TRANSMITTING APPARATUS AND RECEIVING APPARATUS THEREOF

(75) Inventors: Tae Hyoung Kim, Pyeongtaek-si (KR); Woo Jin Jeong, Pyeongtaek-si (KR); Man Gu Kwon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 12/787,207

(22) Filed: May 25, 2010

(65) Prior Publication Data

US 2011/0050387 A1  Mar. 3, 2011

(30) Foreign Application Priority Data

Sep. 1, 2009 (KR) .................. 10-2009-0082187
Sep. 1, 2009 (KR) .................. 10-2009-0082197
Sep. 22, 2009 (KR) .................. 10-2009-0089320

(51) Int. Cl.
*G06F 3/00* (2006.01)
*H04N 5/445* (2011.01)
*G06F 9/00* (2006.01)

(52) U.S. Cl.
USPC .............. 340/12.22; 340/12.23; 340/12.5; 340/3.1

(58) Field of Classification Search
CPC ............. G06F 3/00; G06F 9/00; H04N 5/445; H04N 7/18
USPC ............... 340/3.1, 12.22, 12.23, 12.5, 12.52; 725/139, 37, 141; 709/328; 348/734
See application file for complete search history.

(56) References Cited

U.S. PATENT DOCUMENTS

| | | | | |
|---|---|---|---|---|
| 5,952,936 | A * | 9/1999 | Enomoto | 340/12.22 |
| 6,781,518 | B1 | 8/2004 | Hayes et al. | |
| 7,049,995 | B2 | 5/2006 | Nierzwick et al. | |
| 7,307,574 | B2 * | 12/2007 | Kortum et al. | 341/176 |
| 7,378,984 | B2 * | 5/2008 | Suzuki et al. | 340/12.51 |
| 8,056,104 | B2 * | 11/2011 | Stecyk et al. | 725/80 |
| 8,286,210 | B2 * | 10/2012 | Boyden et al. | 725/80 |
| 8,325,022 | B2 | 12/2012 | Lippincott | |
| 8,340,499 | B2 * | 12/2012 | Kikkawa et al. | 386/248 |
| 2002/0194596 | A1 * | 12/2002 | Srivastava | 725/37 |
| 2004/0148629 | A1 | 7/2004 | Shibamiya et al. | |
| 2007/0220150 | A1 * | 9/2007 | Garg | 709/226 |
| 2007/0258718 | A1 | 11/2007 | Furlong et al. | |
| 2008/0060047 | A1 | 3/2008 | Holliday et al. | |

FOREIGN PATENT DOCUMENTS

| | | |
|---|---|---|
| CN | 1790435 A | 6/2006 |
| EP | 1 727 107 A2 | 11/2006 |
| KR | 10-2006-0005878 A | 1/2006 |
| KR | 10-0718437 B1 | 5/2007 |
| KR | 10-2008-0001326 A | 1/2008 |
| KR | 10-2009-0017797 A | 2/2009 |
| WO | WO 03/032272 A1 | 4/2003 |
| WO | WO 2006/065252 A1 | 6/2006 |
| WO | WO 2008/013131 A1 | 1/2008 |

* cited by examiner

*Primary Examiner* — Nam V Nguyen
(74) *Attorney, Agent, or Firm* — Birch, Stewart, Kolasch & Birch, LLP

(57) ABSTRACT

A method for controlling an external device and a signal transmitting and receiving apparatus thereof. The method for controlling an external device in a receiving apparatus that receives media signals from a transmitting apparatus connected through a wireless network, includes according to an embodiment: receiving information on the external devices connected to the transmitting apparatus from the transmitting apparatus; and displaying the external devices connected to the transmitting apparatus by using the received information.

18 Claims, 9 Drawing Sheets

FIG.4
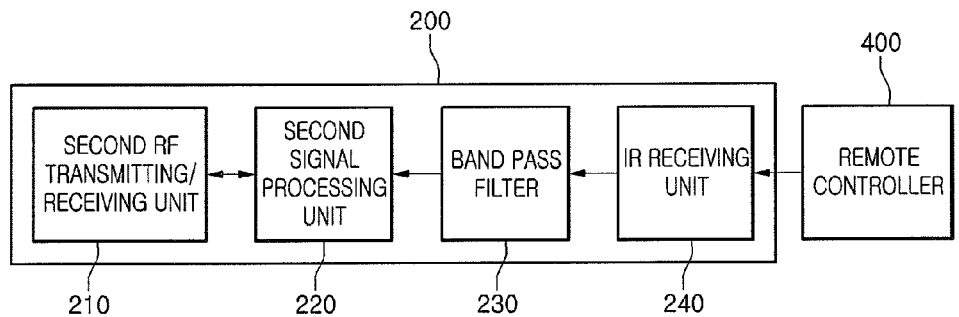
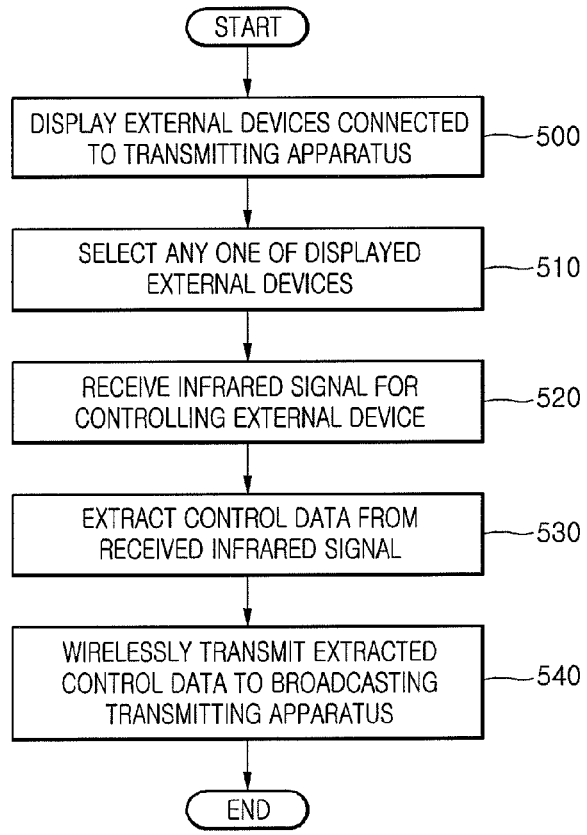
FIG.5

METHOD FOR CONTROLLING EXTERNAL DEVICE AND TRANSMITTING APPARATUS AND RECEIVING APPARATUS THEREOF

CROSS-REFERENCE TO RELATED APPLICATIONS

Pursuant to 35 U.S.C. §119(a), this application claims the benefit of earlier filing date and right of priority to Korean Application No. 10-2009-0082187 filed on Sep. 1, 2009, Korean Application No. 10-2009-0082197 filed on Sep. 1, 2009, and Korean Application No. 10-2009-0089320 filed on Sep. 22, 2009, the contents of which are hereby incorporated by reference herein in their entirety.

BACKGROUND OF THE INVENTION

1. Field of the Invention

The present invention relates to a method for controlling an external device and a signal transmitting and receiving apparatus thereof, and more specifically, to a method for controlling an external device in an apparatus for transmitting and receiving media signals by using a wireless network.

2. Discussion of the Related Art

In general, a display apparatus may include a receiving unit that receives media signals including video and audio from a broadcasting system, a cable system, and other external devices (VCR, DVD, etc.) and processes and outputs the received media signals and a display unit that displays the video of the processed media signals on a screen.

Meanwhile, the receiving unit and the display unit may be integrated or may be separated from each other. In recent years, a wireless type display system has been provided, which transmits the media signals received by using an additional receiving apparatus to the display apparatus through wireless communication and displays the transmitted media signals on the screen.

SUMMARY OF THE INVENTION

An exemplary embodiment of the present invention provides a method for controlling an external device in a receiving apparatus that receives media signals from a transmitting apparatus connected through a wireless network, the method including: receiving information on the external devices connected to the transmitting apparatus from the transmitting apparatus; and displaying the external devices connected to the transmitting apparatus by using the received information.

Another embodiment of the present invention provides a method for controlling an external device, the method including: displaying at least one external device that is connected to the transmitting apparatus; receiving remote control signals for the external devices; extracting data for controlling the external devices from the received remote control signals; and transmitting the extracted control data to the transmitting apparatus by using the wireless network.

Yet another embodiment of the present invention provides a receiving apparatus for receiving media signals from a transmitting apparatus by using a wireless network, including: a control signal receiving unit that receives remote control signals for external devices connected to the transmitting apparatus; a band pass filter that extracts a baseband signal among the received remote control signals; a signal processing unit that converts and outputs control data included in the baseband signal; and an RF transmitting/receiving unit that transmits the control data output from the signal processing unit to the transmitting apparatus.

Still yet another embodiment of the present invention provides a transmitting apparatus that is connected to external devices to transmit media signals to a receiving apparatus by using a wireless network, including: an RF transmitting/receiving unit that receives control data for the external devices from the receiving apparatus by using the wireless network; a control signal generation unit that generates remote control signals for controlling the external devices by using the received control data; and a control signal transmitting unit that transmits the generated remote control signals to the external devices.

A display apparatus according to an exemplary embodiment of the present invention may include the receiving apparatus.

Meanwhile, the method for controlling an external device may be implemented by a computer-readable recording media on which a program executed in the computer is recorded.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 4 is a block diagram illustrating a configuration of a receiving apparatus according to an embodiment of the present invention;

FIG. 5 is a flowchart illustrating a method for controlling an external device according to an embodiment of the present invention;

DETAILED DESCRIPTION OF PREFERRED EMBODIMENTS

Hereinafter, a method for controlling an external device and a transmitting apparatus, a receiving apparatus, and a display apparatus thereof according to embodiments of the present invention will be described in detail with reference to the accompanying drawings.

Figure 1:
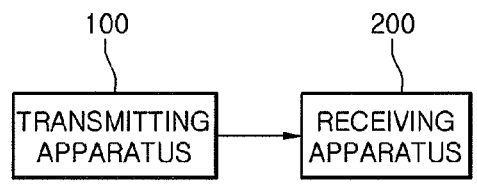
FIG. 1 is a block diagram schematically illustrating a configuration of a signal transmitting/receiving system.

FIG. 1 is a block diagram illustrating an embodiment of a configuration of a transmitting/receiving system. The transmitting/receiving system may include a transmitting apparatus 100 and a receiving apparatus 200.

Referring to FIG. 1, the transmitting apparatus 100 receives media signals including video and audio from a broadcasting system, a cable system, or external devices and converts the received media signals into data in a wireless transmittable format and wirelessly transmits the data.

The receiving apparatus 200 receives and processes data wirelessly transmitted from the transmitting apparatus 100. For this, one or more wireless communication schemes for wirelessly transmitting and receiving data may be previously established between the transmitting apparatus 100 and the receiving apparatus 200.

Meanwhile, the transmitting apparatus 100 includes various input terminals such as a high-definition multimedia interface (HDMI) terminal connected with an antenna or external devices, a universal serial bus (USB) terminal, a component terminal, an external input terminal, an RGB terminal, an antenna cable terminal, etc. and can receive the media signals by using the input terminals For example, the media signals may include broadcasting signals received by using the antenna, a cable, or the like or video signals and audio signals received from connected external devices in the transmitting apparatus 100.

The transmitting apparatus 100 may be a set-top box (STB) that receives the media signals by using a wired or wireless network and converts and wirelessly transmits the received media signal to the receiving apparatus 200.

However, the transmitting apparatus 100 according to the embodiment of the present invention is not limited to the set-top box (STB) and may include all kinds of apparatuses that can receive the media signals transmitted from the outside and wirelessly transmit the received media signals to the receiving apparatus 200

For example, the transmitting apparatus 100 according to the embodiment of the present invention may be included in a computer or a portable terminal such as a cellular phone, etc.

Further, the receiving apparatus 200 can receive and process the data wirelessly transmitted from the transmitting apparatus 100 and then, can transmit the data to external devices that output the video or audio included in the media signals.

For example, the receiving apparatus 200 can convert the video signal wirelessly transmitted from the transmitting apparatus 100 into a displayable format and output the video signal on a display apparatus (not shown) More specifically, when the video signal wirelessly transmitted from the transmitting apparatus 100 is encoded by a coding scheme such as an MPEG, etc., the receiving apparatus 200 can decode the received video signal and output the decoded video signal to the display apparatus (not shown).

According to the embodiment of the present invention, the transmitting apparatus 100 and the receiving apparatus 200 can transmit and receive the media signals by using various wireless communication schemes, for example, wireless communication schemes such as wireless HD (WiHD), wireless home digital interface (WHDi), wireless Lan (WiFi), etc The WiHD uses a frequency band of approximately 60 GHz and can transmit and receive data at transmission rate of approximately 4 Gbps, thereby making it possible to transmit HD video data of 1080p (1902×1080) without compression. However, the WiHD uses high frequency of 60 GHz-band, such that a data transmitting/receiving distance is approximately 10 m and the transmission/reception quality may be easily influenced by obstacles in the vicinity of an installation space The WHDi can transmit and receive the data at transmission rate of approximately 1.8 Gbps by using a frequency band of approximately 5 GHz Further, the WHDi uses a relatively low high frequency band of 5 GHz, such that the data transmitting/receiving distance is approximately 30 m and the transmission/reception quality may not greatly be influenced by the obstacles in the vicinity of the installation space. Meanwhile, when the HD video data of 1080p (1920×1080) is transmitted by using the WHDi at the transmission rate of approximately 1.8 Gbps, the transmitting apparatus 100 needs to partially compress and transmit the HD video data.

Further, the WiFi can transmit and receive the data at transmission rate of approximately 54 Mbp by using a frequency band of approximately 2.4 GHz. The WiFi uses a low high frequency band of 2.4 GHz, such that the data transmitting/receiving distance is approximately 50 to 200 m and the transmission/reception quality may not almost be influenced by the obstacles in the vicinity of the installation space. Meanwhile, when the HD video data of 1080p (1920×1080) is transmitted by using the WiFi at a low transmission rate of approximately 54 Mbps, the transmitting apparatus 100 needs to compress and transmit the HD video data and as a result, the image quality of the video signal received in the receiving apparatus 200 may be deteriorated.

Meanwhile, the transmitting apparatus 100 and the receiving apparatus 200 can wirelessly transmit and receive the data for the media signals by using various short-range wireless communication schemes, for example, communication schemes such as Bluetooth, ZigBee, or binary code division multiple access (CDMA), etc. in addition to the above-mentioned wireless communication schemes.

According to an embodiment of the present invention, the transmitting apparatus 100 and the receiving apparatus 200 can transmit video and audio data by using any one of various wireless communication schemes as described above Meanwhile, the transmitting apparatus 100 and the receiving apparatus 200 may transmit and receive the video and audio data by using two or more schemes of the above-mentioned wireless communication schemes, for example, any one of two or more supportable schemes is selected according to the performance, installation environment, video resolution, etc. of each of the transmitting apparatus 100 and the receiving apparatus 200 to be used for data transmission/reception.

Figure 2:
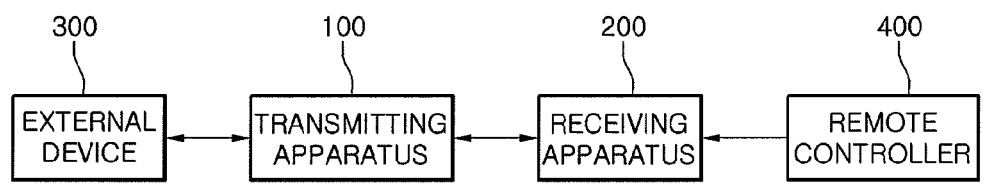
FIG. 2 is a block diagram illustrating a configuration of a transmitting/receiving system according to an embodiment of the present invention.

FIG. 2 is a block diagram illustrating a configuration of a transmitting/receiving system according to an embodiment of the present invention. The system may include a transmitting apparatus 100, a receiving apparatus 200, an external device 300, and a remote controller 400. In components of the transmitting/receiving system shown in FIG. 2, the same components as ones described by referring to FIG. 1 will not be described below.

Referring to FIG. 2, the transmitting apparatus 100 and the receiving apparatus 200 can transmit and receive data by using a wireless communication scheme, i.e., WiHD, WHDi, WiFi, or the like.

The transmitting apparatus 100 may be connected to the external device 300. The transmitting apparatus 100 may receive a video signal and an audio signal from the external device 300. For this, the transmitting apparatus 100 may include input/output terminals such as an HDMI, a USB, a component, an RGB, etc. for transmitting and receiving data to and from the external device 300.

Meanwhile, the external device 300 may be various devices including a video playing device such as a DVD player, a Dvix player, a blue-ray player, or the like, a set-top box such as an IPTV set-top box, a cable set-top box, a satellite set-top box, or the like, a PC, a game machine, a home theater, a portable terminal, a hard disk (HDD) recorder, etc.

However, the external device 300 connected to the transmitting apparatus 100 according to any embodiment of the present invention is not limited to the above-mentioned devices and may include various devices that are connected to the transmitting apparatus 100 to output media signals such as the video signal to the transmitting apparatus 100.

The remote controller 400 transmits a remote control signal for controlling the receiving apparatus 200 according to a user input and the receiving apparatus 200 receives the remote control signal from the remote controller 400 to perform an operation corresponding to the remote control signal.

For example, the remote controller 400 may include a plurality of key buttons for a user's input and may generate and transmit the remote control signal corresponding to user's input for any one of the plurality of key buttons to the receiving apparatus 200.

More specifically, the remote controller 400 may generate and transmit an infrared signal corresponding to the user's key input and the receiving apparatus 200 may receive the infrared signal and perform an operation corresponding to the received infrared signal. For this, the remote controller 400 and the receiving apparatus 200 may include an IR transmitting unit (not shown) and an IR receiving unit (not shown) for transmitting and receiving the infrared signal, respectively.

However, the present invention is not limited to the transmission and reception of the remote control signal using the above-mentioned infrared communication scheme and the remote control signal can be transmitted and received between the remote controller 400 and the receiving apparatus 200 by using various wireless communication methods, for example, a communication method using an RF signal, an optical signal, etc., in addition to the infrared communication scheme.

According to an embodiment of the present invention, the remote controller 400 may transmit the remote control signal for controlling the external device 300, for example, an infrared signal to the receiving apparatus 200.

That is, the remote controller 400 may receive key input corresponding to a predetermined operation of the external device 300 from a user, and generate and transmit an infrared signal corresponding to the key input.

In this case, the receiving apparatus 200 may receive the infrared signal for the external device 300 from the remote controller 400 and wirelessly transmit data for controlling the external device 300 that is included in the received infrared signal to the transmitting apparatus 100.

More specifically, the receiving apparatus 200 may wirelessly transmit control data for the external device 300 to the transmitting apparatus 100 by using a wireless network connected to the transmitting apparatus 100, for example, the wireless communication scheme such as the WiHD, WHDi, WiFi, or the like for transmitting and receiving the media signals.

The transmitting apparatus 100 may wirelessly receive the control data from the receiving apparatus 200 and transmit the received control data to the external device 300. Therefore, the external device 300 may perform an operation corresponding to user's input using the remote controller 400.

In general, in order to control the external device 300, the transmitting apparatus 100, and the receiving apparatus 200 shown in FIG. 2, a plurality of remote control devices corresponding to the devices, that is, remote controllers need to be used.

Further, in order to control any one device of the devices, the user carrying a remote controller corresponding to the device moves to a location adjacent to the device and then, needs to perform key input corresponding to his/her desired operation on the remote controller.

Therefore, when the external device 300 is installed far away from the receiving apparatus 200, the user who watches a broadcast at a location adjacent to the receiving apparatus 200 may have an inconvenience to move to the location where the corresponding apparatus is installed in order to control the external device 300.

According to an embodiment of the present invention, when the receiving apparatus 200 receives the remote control signal for controlling the external device 300 connected to the transmitting apparatus 100 from the remote controller 400 and transmits the control data for the received remote control signal to the transmitting apparatus 100 by using the wireless communication scheme connected to the transmitting apparatus 100 to allow the corresponding device to perform an operation corresponding to the remote control signal, such that the user can control the operation of the external device 300 by using the remote controller 400 at a location adjacent to the receiving apparatus 200.

Figure 3:
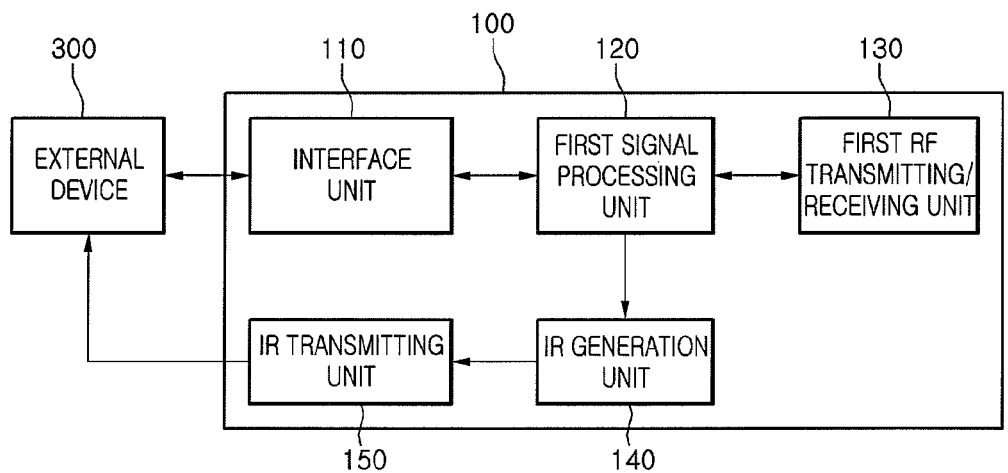
FIG. 3 is a block diagram illustrating a configuration of a transmitting apparatus according to an embodiment of the present invention.

FIG. 3 is a block diagram illustrating a configuration of a transmitting apparatus according to an embodiment of the present invention. The transmitting apparatus 100 may include an interface unit 110, a first signal processing unit 120, a first RF transmitting/receiving unit 130, an IR generation unit 140, and an IR transmitting unit 150. In components of the transmitting/receiving apparatus 100 shown in FIG. 3, the same components as ones described by referring to FIGS. 1 and 2 will not be described below.

Referring to FIG. 3, the interface unit 110 transmits and receives a signal to and from the external device 300 and for this, the interface unit 110 may include input terminals such as an HDMI, a USB, a component, an RGB, etc. for connecting to the external device 300.

The first signal processing unit 120 may convert signals received from the external device 300, for example, a video signal and an audio signal into data in a wireless transmittable form in accordance with a predetermined wireless communication scheme and then, output the converted data.

For example, when the signals received from the external device 300 are encoded by a coding scheme such as an MPEG, etc., the first signal processing unit 120 may include an A/V processing unit (not shown) decoding the video and audio signals received from the external device 300.

The first RF transmitting/receiving unit 130 wirelessly transmits the signal outputted from the first signal processing unit 120 to the receiving apparatus 200. For this, the first RF transmitting/receiving unit 130 may include an antenna (not shown) and a converter (not shown), i.e., an up-converter and a down-converter.

Meanwhile, the first RF transmitting/receiving unit 130 may receive control data for controlling the operation of the external device 300 from the receiving apparatus 200 by using the wireless communication scheme, i.e., WiHD, WHDi, WiFi, or the like.

The IR generation unit 140 may generate the remote control signal for controlling the operation of the external device 300, that is, an infrared signal for the control data received from the receiving apparatus 200.

Further, the IR transmitting unit 150 may transmit the infrared signal generated by the IR generation unit 140 to the external device 300 and the external device 300 may perform an operation corresponding to the infrared signal transmitted from the IR transmitting unit 150 of the transmitting apparatus 100.

Therefore, the operation of the external device 300 can be controlled by using the infrared signal that is wirelessly transmitted from the receiving apparatus 200 that is far away from the external device 300 and is received through the transmitting apparatus 100.

According to another embodiment of the present invention, the transmitting apparatus 100 may transmit the control data wirelessly transmitted from the receiving apparatus 200 to the external device 300 through the interface unit 110.

For example, the first signal processing unit 120 may convert the received control data into a signal of a format to be transmitted to the external device 300 in accordance with an interface with the external device 300 and output the signal. The interface unit 110 may transmit the control data processed by the first signal processing unit 120 to the external device 300.

Accordingly, the external device 300 may receive the control data through the interface unit 110 of the transmitting apparatus 100 and perform an operation corresponding to the inputted control data.

FIG. 4 is a block diagram illustrating a configuration of a receiving apparatus according to an embodiment of the present invention. The receiving apparatus 200 may include a control signal receiving unit, a data extraction unit, a signal processing unit, and an RF transmitting unit.

Referring to FIG. 4, the second RF transmitting/receiving unit 210 may wirelessly receive the media signals, for example, the video signal and the audio signal from the transmitting apparatus 100 and for this, may include an antenna (not shown) and a converter (not shown), more specifically, an up-converter and a down-converter.

The second signal processing unit 220 may convert the signal received in the second RF transmitting/receiving unit 210 into an outputtable format in a display apparatus (not shown). For example, when the signal received from the transmitting apparatus 100 is encoded in accordance with a coding scheme such as an MPEG, etc., the second signal processing unit 220 may include an A/V processing unit (not shown) decoding the received video and audio signals.

According to an embodiment of the present invention, the control signal receiving unit receives the remote control signal for the external device 300 connected to the transmitting apparatus 100 and as shown in FIG. 4, may be configured of an IR receiving unit 240.

The IR receiving unit 240 can receive the infrared signal for controlling the operation of the external device 300 connected to the transmitting apparatus 100 from the remote controller 400.

Meanwhile, a data extraction unit extracts the control data from the received control signals and as shown in FIG. 4, can be configured of a band pass filter 230.

The band pass filter 230 can filter and extract data for controlling the external device 300 from the received infrared signals.

Meanwhile, the extracted control data may be converted into a wirelessly transmittable format through the second signal processing unit 220 and thereafter, may be transmitted to the transmitting apparatus 100 through the second RF transmitting/receiving unit 210.

For example, the control data for the external device 300 may be transmitted to the transmitting apparatus 100 by using the wireless communication scheme such as the WiHD, WHDi, WiFi, or the like.

Hereinafter, a method for processing a remote control signal according to an embodiment of the present invention will be described in more detail with reference to FIGS. 5 to 9.

Below described is an example in which a control signal is transmitted and received between the remote controller 400 and the receiving apparatus 200 or between the transmitting apparatus 100 and the external device 300 by using the infrared communication scheme. However, the present invention is not limited to the transmission and reception of the control signal using the infrared communication scheme and the remote control signal may be transmitted and received by using various wireless communication methods. For example, the communication method using the RF signal, the optical signal, etc., in addition to the infrared communication scheme.

FIG. 5 is a flowchart illustrating a method for processing a remote control signal according to an embodiment of the present invention. The method shown in FIG. 5 will be described by combining the receiving apparatus 200 shown in FIG. 4.

Referring to FIG. 5, when the receiving unit 200 displays the external device 300 that is connected to the transmitting apparatus by using a display unit (not shown) (S500).

For example, the transmitting apparatus 100 is connected to the plurality of external devices 300 and the receiving apparatus 200 can receive information on each external device 300 from the transmitting apparatus 100.

In this case, the receiving apparatus 200 can receive the information on the external devices from the transmitting apparatus 100 by using the wireless communication schemes such as WiHD, WHDi, WiFi, etc., and the display unit (not shown) of the receiving apparatus 200 can display the external devices 300 connected to the transmitting apparatus 100 by using the received information.

As described above, a method for allowing the receiving apparatus 200 to display the external devices that are connected to the transmitting apparatus 100 will be described in detail with reference to FIGS. 10 to 16.

The receiving apparatus 200 selects any one of the displayed external devices 300 from a user (step 510). For example, the user can use the remote controller 400 to select the external devices to be controlled among the displayed external devices 300 by using the remote controller 400.

The IR receiving unit 240 receives the infrared signal transmitted from the remote controller 400 (step 520) and the received infrared signal is the remote control signal for controlling the operation of the external device 300 connected to the transmitting apparatus 100, that is, the external device selected at step 510.

For example, the remote controller 400 receives the key input for controlling the operation of the external device 300 connected to the transmitting apparatus 100 from the user and generates and transmits the infrared signal corresponding to the key input and the IR receiving unit 240 of the receiving apparatus 200 can receive the infrared signal transmitted from the remote controller 400.

A band pass filter 230 extracts data for controlling the operation of the external device 300 from the received infrared signal (step 530).

Figure 7:
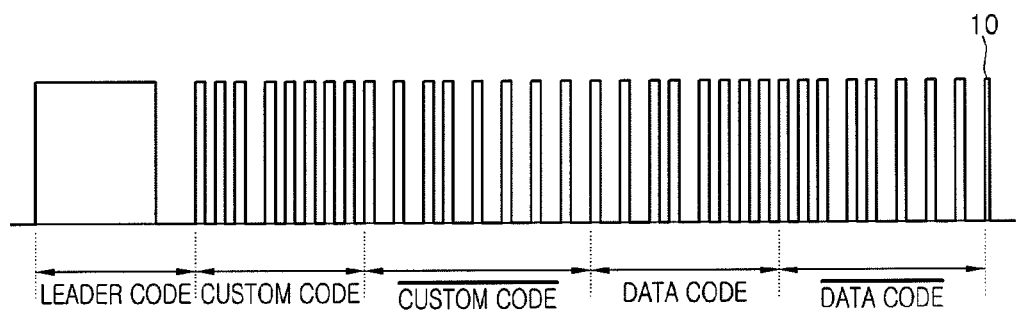
FIG. 7 is a diagram illustrating an embodiment of a code format of an infrared signal.

For example, the infrared signal received from the remote controller 400 includes a leader code, a custom code, and a data code as data for the data for controlling the external device 300 and more specifically, may include the leader code, the custom code, a custom code verification byte, the data code, and a data code verification byte as shown in FIG. 7.

Further, each of the codes may have data of 2 bytes, that is, 8 bits and the infrared signal may include an ending signal bit 10

Meanwhile, the above-mentioned control data may be transmitted from the remote controller 400 to the receiving apparatus 200 with being loaded on a carrier signal having a predetermined frequency and a predetermined duty ratio.

That is, the remote controller 400 may generate a baseband signal as the control data corresponding to the operation of the external device 300 that is input by the user and generate and transmit the infrared signal to the receiving apparatus 200 by synthesizing the baseband signal with the carrier signal having the predetermined frequency and the predetermined duty ratio.

Meanwhile, the carrier signal may have a frequency of 30 kHz to 60 kHz and a duty ratio of 1/2 to 1/3.

According to an embodiment of the present invention, the infrared signal may be transmitted by synthesizing the baseband signal including the control data of the external device 300 with the carrier signal having the frequency of 37 kHz and the duty ratio 1/3.

For example, in the control data included in the baseband signal, the leader code may be constituted by a high of 9 ms and a low of 4.5 ms, bit '1' may be constituted by a high of 0.56 ms and a low of 1.69 ms, and bit '0' may be constituted by a high of 0.56 ms and a low of 0.565 ms.

Meanwhile, the leader code, the custom code, and the data code may constitute one frame and the frame may be repeated at a cycle of 108 ms.

At step 530, the band pass filter 230 may extract the baseband signal including the control data for the external data 300 by filtering the infrared signal received from the remote controller 400. The baseband signal may be an envelope of the received infrared signal.

For example, the band pass filter 230 may be a 38 kHz band pass filter. Therefore, the band pass filter 230 may extract the control data for controlling the external device 300 by removing the carrier frequency from the infrared signal inputted from the IR receiving unit 240 to detect only waveforms of the leader code, the custom code, and the data code that are the baseband signals.

The second RF transmitting/receiving unit 210 wirelessly transmits the control data of the external device 300 that is extracted from the band pass filter 230 to the transmitting apparatus 100 (step 540).

For example, the second signal processing unit 220 may convert the control data included in the baseband signal outputted from the band pass filter 230, that is, the leader code, the custom code, and the data code into data of a format that is wirelessly transmittable by using the predetermined wireless communication scheme, i.e., the WiHD, the WHDi, the WiFi, or the like and output it to the second RF transmitting/receiving unit 210.

The second RF transmitting/receiving unit 210 may wirelessly transmit the control data of the external device 300 that is outputted from the second signal processing unit 220 to the transmitting apparatus 100.

As described above, the receiving apparatus 200 extracts the baseband signal from the infrared signal received from the remote controller 400 and wirelessly transmits only the control data of the external device 300 that is included in the baseband signal to the transmitting apparatus 100 so as to reduce the amount of data wirelessly transmitted and received between the transmitting apparatus 100 and the receiving apparatus 200.

Figure 6:
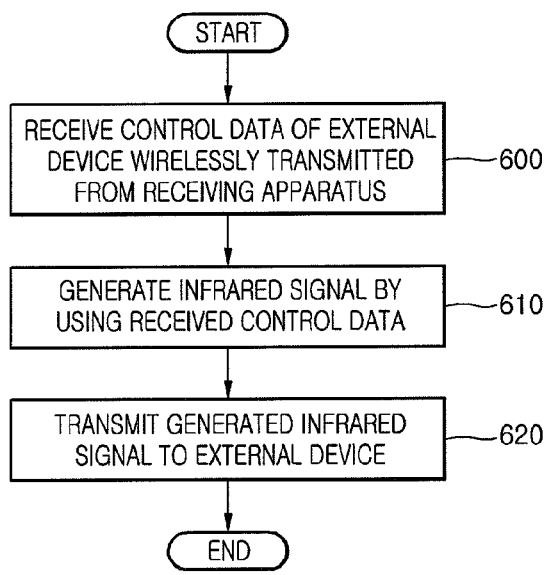
FIG. 6 is a flowchart illustrating a method for controlling an external device according to an embodiment of the present invention.

FIG. 6 is a flowchart illustrating a method for controlling a remote control signal according to an embodiment of the present invention and illustrates a method for the transmitting apparatus 100 to process the control data of the external device 300 that wirelessly transmitted from the receiving apparatus 200 as described by referring to FIG. 5.

Referring to FIG. 6, a first RF transmitting/receiving unit 130 of the transmitting apparatus 100 receives the control data of the external device 300 that is wirelessly transmitted from the receiving apparatus 200 (step 600). For example, the control data received into the first RF transmitting/receiving unit 130 may be data included in the baseband signal among the infrared signals received into the receiving apparatus 200 from the remote controller 400 in order to control the external device 300 connected to the transmitting apparatus 100.

Further, at step 600, the control data of the external device 300 received from the receiving apparatus 200 may include the leader code, the custom code, and the data code.

An IR generation unit 140 generates the infrared signal that is the remote control signal for controlling the operation of the external device 300 by using the control data received in the first RF transmitting/receiving unit 130 (step 610).

For example, the IR generation unit 140 may generate the baseband signal including the control data of the received external device 300 and generate the infrared signal by synthesizing the generated baseband signal with a carrier signal having a predetermined frequency and a predetermined duty ratio.

More specifically, the IR generation unit 140 may generate the baseband signal to include the leader code, the custom code, and the data code of the control data received in the first RF transmitting/receiving unit 130, and synthesize the generated baseband signal with a carrier signal having a frequency of 37 kHz and a duty ratio of 1/3 and output synthesized signal.

An IR transmitting unit 150 transmits the infrared signal generated at step 610 to the external device 300 in order to control the operation of the external device 300 (step 620).

Therefore, the external device 300 may perform an operation corresponding to the infrared signal received from the IR transmitting unit 150 of the transmitting apparatus 100.

Figure 8:
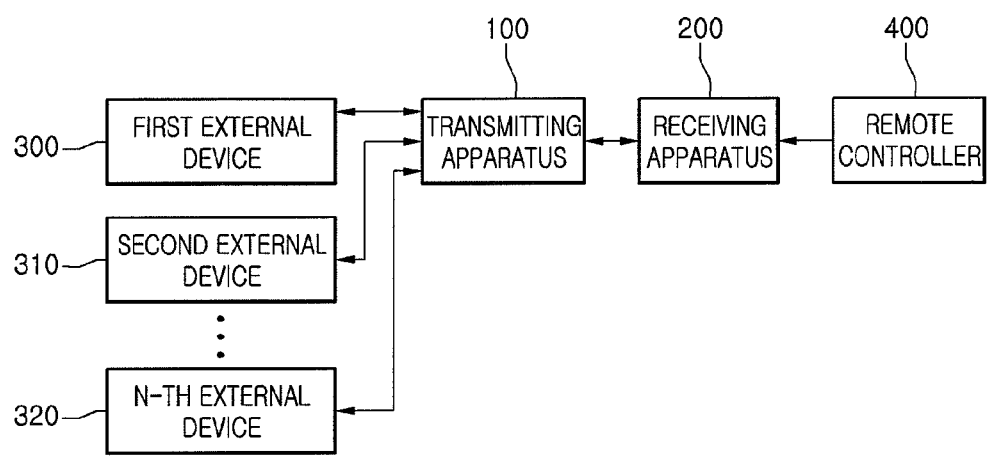
FIG. 8 is a block diagram illustrating a configuration of a transmitting/receiving system according to an embodiment of the present invention.

FIG. 8 is a block diagram illustrating a configuration of a transmitting/receiving system according to an embodiment of the present invention. In components of the transmitting/receiving system shown in FIG. 8, the same components as ones described by referring to FIGS. 1 to 7 will not be described below.

Referring to FIG. 8, a plurality of external devices 300, 310, and 320 may be connected to the transmitting apparatus 100. The plurality of external devices 300, 310, and 320 may be apparatuses that are connected to the transmitting apparatus 100 to supply the media signals, for example, the video signal and the audio signal to the transmitting apparatus 100.

Meanwhile, the external devices 300, 310, and 320 may be various devices including a video playing device such a Dvix player, a blue-ray player, or the like, a set-top box such as an IPTV set-top box, a cable set-top box, a satellite set-top box, or the like, a PC, a game machine, a home theater, a portable terminal, a hard disk recorder, etc.

In this case, a user may perform key input for controlling the operation of any one of the plurality of external devices 300, 310, and 320 by using the remote controller 400 and the remote controller 400 may generate an infrared signal corresponding to the user's key input and transmit the generated infrared signal to the receiving apparatus 200.

As described above, the receiving apparatus 200 may extract the control data for controlling the corresponding external device from the infrared signal received from the remote controller 400 and transmit the control data of the external device to the transmitting apparatus 100 by using the wireless communication scheme such as the WiHD, WHDi, WiFi, or the like.

Meanwhile, when the received remote control signal is the signal for controlling the operation of the transmitting apparatus 100 or any one of the plurality of external device 300, 310, and 320, the received remote control signal may be wirelessly transmitted to the transmitting apparatus 100 in addition to the apparatus identification information by using the wireless communication scheme such as the WiHD, WHDi, WiFi, or the like.

The transmitting apparatus 100 generates an infrared signal for controlling the corresponding external device by using the control data received from the receiving apparatus 200 and, for example, may generate the infrared signal by synthesizing the baseband signal including the control data with a carrier signal having a predetermined frequency and a predetermined duty ratio. Meanwhile, the transmitting apparatus 100 may transmit the generated infrared signal to the corresponding external device.

The transmitting apparatus 100 may verify which external device of the plurality of external devices 300, 310, and 320 the control data is used to control by analyzing the received control data.

For example, the transmitting apparatus 100 generates the infrared signal by using the received control data to transmit the generated infrared signal to the first external device 300 when the received control data is used to control the first external device 300.

Meanwhile, in FIG. 8, one remote controller 400 is shown, but according to another embodiment of the present invention, a plurality of remote controllers corresponding to the plurality of external devices 300, 310, and 320, respectively, may be provided.

Accordingly, an infrared signal transmitted from a predetermined remote controller may be transmitted to an external device corresponding to the remote controller among the plurality of external devices 300, 310, and 320 through the receiving apparatus 200 and the transmitting apparatus 100.

Figure 9:
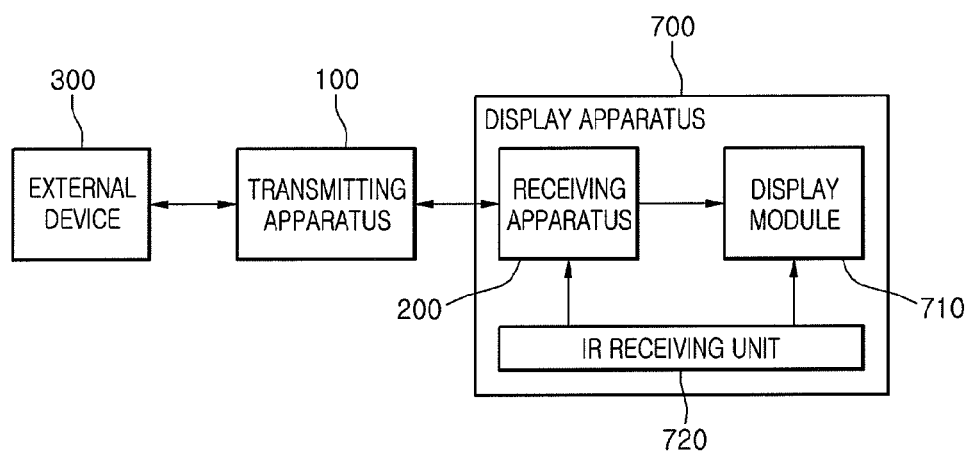
FIG. 9 is a block diagram illustrating a configuration of a transmitting/receiving system according to an embodiment of the present invention.

FIG. 9 is a block diagram illustrating a configuration of a transmitting/receiving system according to an embodiment of the present invention. In components of the transmitting/receiving system shown in FIG. 9, the same components as ones described by referring to FIGS. 1 to 8 will not be described below.

Referring to FIG. 9, a display apparatus 700 according to an embodiment of the present invention may include the receiving apparatus 200 having the above-mentioned configuration and a display module 710.

That is, the transmitting apparatus 100 receives the media signals from the external device 300 and wirelessly transmits the received media signal to the receiving apparatus 200 and the receiving apparatus 200 provided in the display apparatus 700 processes the wirelessly transmitted data into a video signal of a displayable format to output the processed data to the display module 710.

The display module 710 may display a video by using the video signal inputted from the receiving apparatus 200. For this, the display module 710 may include display panels (not shown) of various display types such as a liquid crystal display (LCD), a plasma display panel (PDP), an electro luminescent display (ELD), a vacuum fluorescent display (VFD), etc.

According to an embodiment of the present invention, an IR receiving unit 720 provided in the display apparatus 700 may receive the infrared signal for controlling the external device 300 that is transmitted from the remote controller 400.

As described above, the receiving apparatus 200 provided in the display apparatus 700 extracts the control data for the external device 300 from the infrared signal received from the remote controller 400 to wirelessly transmit the extracted control data to the transmitting apparatus 100.

Figure 10:
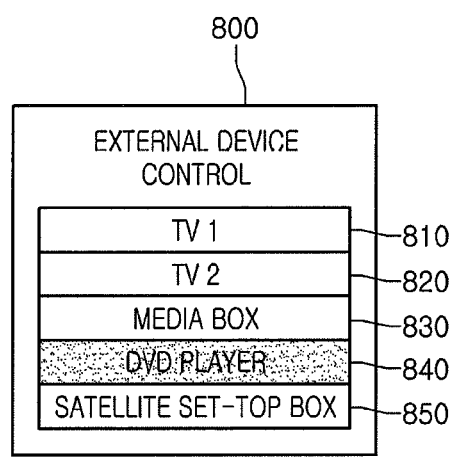
FIG. 10 is a diagram illustrating an embodiment of the method for displaying information on external devices.

Referring to FIG. 10, the display module 710 may display an external device control window 800 that displays information on the controllable external devices on a screen.

That is, a TV 1 810 and a TV 2 820 that are other display apparatuses connected to the transmitting apparatus 100 by the wireless network, in addition to the display apparatus 700, may be displayed on the external device control window 800 and a media box 830 that is the transmitting apparatus 100, a DVD player 840 that is the external device 400 connected to the media box, a satellite set-top box 850, etc., may be displayed on the external device control window 800.

The user may select an apparatus which he/she wants to control the operation among the plurality of displayed external devices by using the remote controller 400, for example, the DVD player 840 connected to the transmitting apparatus 100 and input the operation to be performed to the selected external device, that is, the DVD player 840.

Meanwhile, the receiving apparatus 200 includes the display unit (not shown) to display the information on the above-mentioned external devices, for example, the external device control window 800 as shown in FIG. 10 by the display unit (not shown).

For this, the receiving apparatus 200 may receive the information on the external devices 400 connected to the transmitting apparatus 100 from the transmitting apparatus 100 by using the wireless network and display the information on the external devices 400 connected to the transmitting apparatus 100 on the screen by using the received information.

Figure 11:
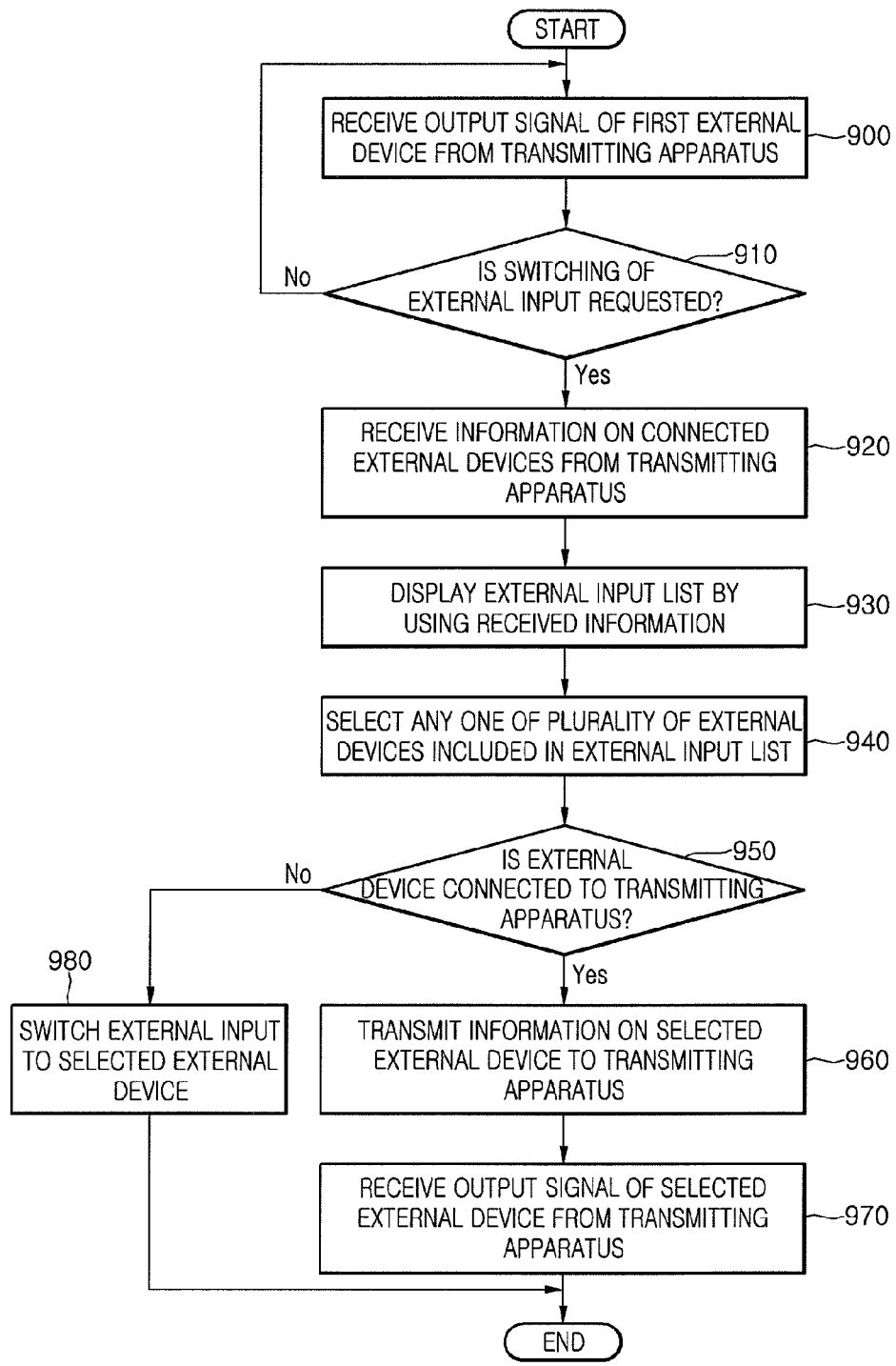
FIG. 11 is a flowchart illustrating a method for controlling an external device according to an embodiment of the present invention.

FIG. 11 is a flowchart illustrating a method for controlling an external device according to an embodiment of the present invention and the method for controlling an external device that is shown in FIG. 11 will be described by combining the block diagram shown in FIG. 4.

Referring to FIG. 11, the second transmitting/receiving unit 210 of the receiving apparatus 200 receives the output signal of the first external device 300 from the transmitting apparatus 100 by selecting the first external device 300 as the external input by the user (step 900).

For example, the transmitting apparatus 100 can receive the media signals from the first external device 300, for example, the video signal and the audio signal and wirelessly transmit the signal input from the first external device 300 to the receiving apparatus 200.

The user can request the display of the external input list to switch the external input, more specifically, switch the external input during the wireless reception of the output signal of the first external device 300.

Meanwhile, the external input list may include the information on the external devices connected to the transmitting apparatus 100.

As described above, when the switching of the external input is requested (step 910), the second RF transmitting/receiving unit 210 receives the information on the external devices 300, 310, and 320 connected to the transmitting apparatus 100, for example, the information on the name or type of each external device 300, 310, and 320 from the transmitting apparatus (step 920).

According to an embodiment of the present invention, the transmitting apparatus 100 may receive the identification information on the name or type of the corresponding device from the connected external devices 300, 310, and 320, convert the information on the input external devices 300, 310, and 320 into a wireless transmittable format, and then, transmit it to the receiving apparatus 200 by using the wireless network such as WiHD, WHDi, WiFi, etc.

The receiving apparatus 200 displays the external input list by using the external devices 300, 310, and 320 received in the second RF transmitting/receiving unit 210 to display the external input list (step 930). For this, the receiving apparatus 200 may further include the display unit (not shown).

For example, the displayed external input list may further include information on one or more external devices (not shown) connected to the receiving apparatus 200, in addition to the information on the external devices 300, 310, and 320 connected to the transmitting apparatus 100.

Therefore, the user can grasp the external devices 300, 310, and 320 connected to the transmitting apparatus 100 and the external devices (not shown) connected to the receiving apparatus 200 by using the displayed external input list.

The user may switch the external input by using the displayed external input list and for example, request the switching of the external input to the selected external device by selecting any one of the plurality of external devices included in the external input list.

That is, the receiving apparatus selects the plurality of external devices included in the external input list, for example, the external devices 300, 310, and 320 connected to the transmitting apparatus 100 and any one of the external devices (not shown) connected to the receiving apparatus 200 from the user (step 940).

Figure 12:
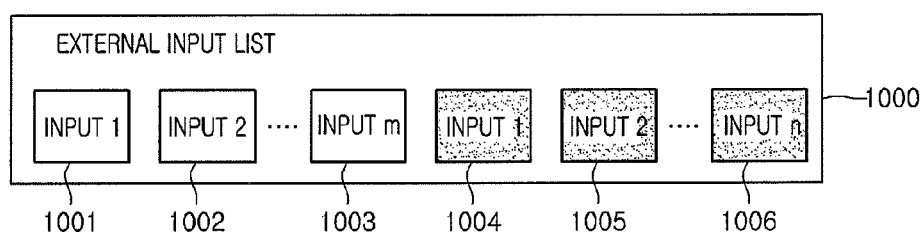
FIG. 12 is a diagram illustrating an embodiment of the method for displaying information on external devices.

Referring to FIG. 12, icons 1001, 1002, and 1003 corresponding to the external devices (not shown) connected to the receiving apparatus 200 may be displayed on the external input list 1000 and at the same time, icons 1004, 1005, and 1006 corresponding to the external devices 300, 310, and 320 connected to the transmitting apparatus 100 may be displayed on the external input list 1000.

As shown in FIG. 12, the icons 1001, 1002, and 1003 corresponding to the external devices (not shown) of the receiving apparatus 200 and the icons 1004, 1005, and 1006 corresponding to the external devices of the transmitting apparatus 100 may be displayed to be differentiated from each other.

The user selects any one of the icons 1001 to 1006 displayed on the external input list 1000 to select the external device to be switched.

For example, the user may select any one of the icons 1001, 1002, and 1003 corresponding to the external devices of the receiving apparatus 200 and switch the external input to the external device corresponding to the selected icon among the plurality of external devices (not shown) connected to the receiving apparatus 200, not the transmitting apparatus 100.

In addition, the user may select any one of the icons 1004, 1005, and 1006 corresponding to the external devices of the transmitting apparatus 100 and switch the external input of the transmitting apparatus 100 to the external device corresponding to the selected icon among the plurality of external devices 300, 310, and 320.

The name or type of the external devices 300, 310, and 320 connected to the transmitting apparatus 100 and the external devices (not shown) connected to the receiving apparatus 200, respectively, may be displayed on the icons 1001 to 1006 of the external input list 1000.

As described above, when the external device selection using the external input list of the user completes, it is determined whether the selected external device is the external device connected to the transmitting device 100 (step 950).

When the external device selected by the user is the external device connected to the transmitting apparatus 100, the second RF transmitting/receiving unit 210 transmits the information on the selected external device to the transmitting apparatus 100 (step 960).

For example, the second RF transmitting and receiving unit 210 may wirelessly transmit the identification information on the selected external device to the transmitting apparatus 100 by using the wireless network such as WiHD, WHDi, WiFi, etc., to request the switching of the external input to the selected external device.

Thereafter, the second RF transmitting and receiving unit 210 receives the signal output from the selected external device from the transmitting apparatus 100 (step 970).

For example, the transmitting apparatus 100, that receives the information on the external information selected by the user, ends the connection with the currently connected first external device 300 by using the interface unit 100 and connects with the selected external device to switch the external input.

The transmitting apparatus 100 can wirelessly transmit the signal input from the switched external device, in more detail, the video signal and the audio signal to the receiving apparatus 200 by using the first RF transmitting and receiving unit 130.

Meanwhile, when the external device selected by the user is not the external device connected to the transmitting apparatus 100, that is, when the external device selected by the user is the external device connected to the receiving apparatus 200, the receiving apparatus 200 performs the switching of the external input to the selected external device (step 980).

In more detail, the interface unit (not shown) included in the receiving apparatus 200 ends the connection with the existing transmitting apparatus 100 through the wireless network and connects with the external device selected by the user to receive the video signal and the audio signal from the switched external device.

According to an embodiment of the present invention, the user uses the displayed external input list 1000 to select the external device to be controlled. In other words, the user may select any one of the icons 1001 to 1006 included in the external input list 1000 to select the desired external device among the external devices 300, 301, and 320 connected to the transmitting apparatus 100 and the external devices (not shown) connected to the receiving apparatus 200 and may select the operation of the selected external device by using the remote controller 400.

Figure 13:
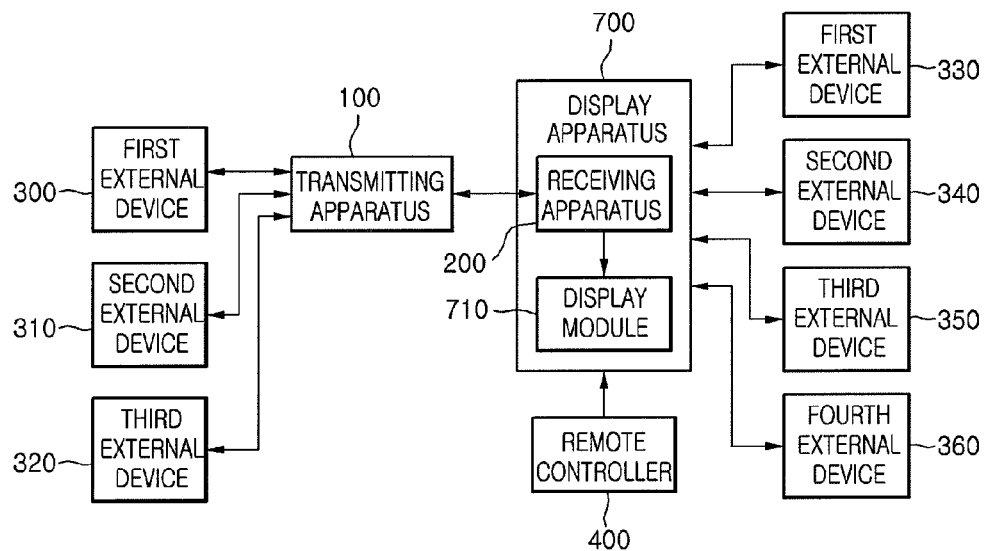
FIG. 13 is a block diagram illustrating a configuration of a transmitting/receiving system according to an embodiment of the present invention.

FIG. 13 is a block diagram illustrating a configuration of a transmitting/receiving system according to an embodiment of the present invention. In components of the transmitting/receiving system shown in FIG. 13, the same components as ones described by referring to FIGS. 1 to 12 will not be described below.

Referring to FIG. 13, the plurality of external devices 300, 310, and 320 may be connected to the transmitting apparatus 100 and the transmitting apparatus 100 and the transmitting apparatus 100 and the plurality of external devices 330, 340, 350, and 360 may also be connected to the display apparatus 700.

According to an embodiment of the present invention, the display module 710 provided in the display apparatus 700 may display the external input list that includes the information on the external devices 330, 340, 350, and 360 connected to the display apparatus 700 and the information on the external devices 300, 310, and 320 connected to the transmitting apparatus 100.

Figure 14:
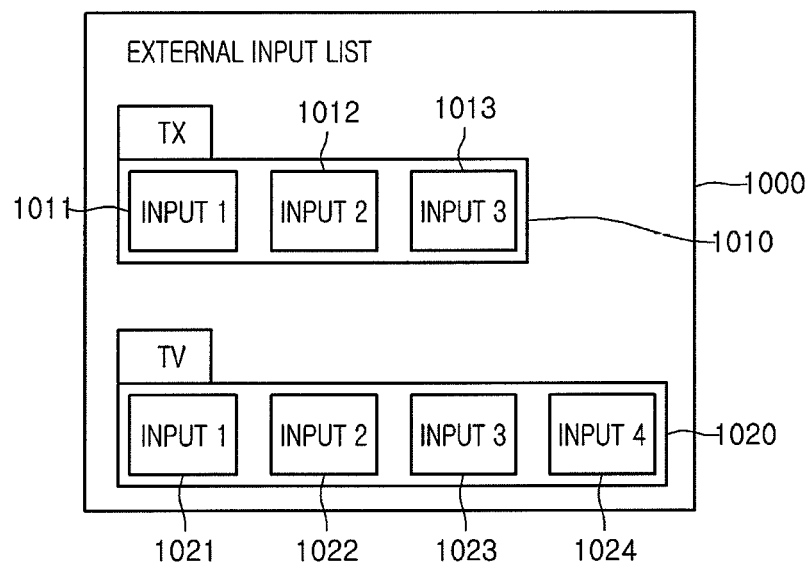
FIG. 14 is a diagram illustrating an embodiment of the method for displaying information on external devices.

Referring to FIG. 14, the external input list 1000 may divide and display the information on the external devices 330, 340, 350, and 360 connected to the display device 700 and the information on the external devices 300, 310, and 320 connected to the transmitting apparatus 100.

For example, the icons 1001, 1022, 1023 corresponding to the external devices 300, 310, and 320 of the transmitting apparatus 100 may be included and displayed in a subs list 1010 of an item called "Tx" and the icons 1021, 1022, 1023, and 1024 corresponding to the external devices 330, 340, 350, and 360 connected to the display apparatus 700 may be included and displayed in a sub list 1020 of an item called "TV".

The user may select any one of the icons 1011, 1012, and 1013 included in the "Tx" sub list 1010 to select the external device to be switched among the external devices 300, 310, and 320 connected to the transmitting apparatus 100 and may select any one of the icons 1021, 1022, 1023, and 1024 included in the "TV" sub list 1020 to select the external device to be switched among the external devices 330, 340, 350, and 360 connected to the display apparatus 700.

Figure 15:
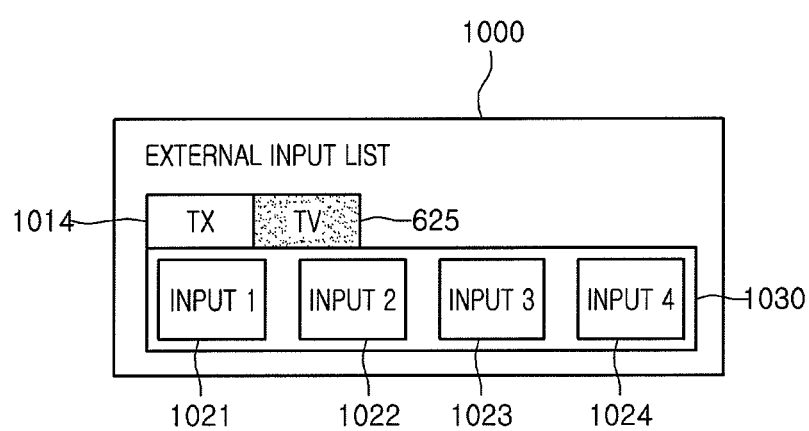
FIG. 15 is a diagram illustrating an embodiment of the method for displaying information on external devices.

Referring to FIG. 15, the user may use selection buttons 1014 and 1025 displayed on the external input list 1000 to select the external devices 330, 340, 350, and 360 connected to the display apparatus 700 and the external devices 300, 310, and 320 connected to the transmitting apparatus 100.

In other words, as shown in FIG. 15, when the user selects a "TV" button, the icons 1021, 1022, 1023, and 1024 corresponding to the external devices of the display apparatus 700 may be displayed on the selection window 1030 and the user may select any one of the icons 1021, 1022, 1023, and 1024 displayed on the selection window to select the external device to be switched among the external devices 330, 340, 350, and 360 connected to the display apparatus 700.

Meanwhile, when the user selects a "TX" button, the icons 1011, 1012, and 1013 corresponding to the external devices of the transmitting apparatus 100 may be displayed on the selection window 1030 and the user may select any one of the icons 1011, 1012, and 1013 displayed on the selection window 1030 to select the external input to be switched among the external devices 300, 310, and 320 connected to the transmitting apparatus 100.

Figure 16:
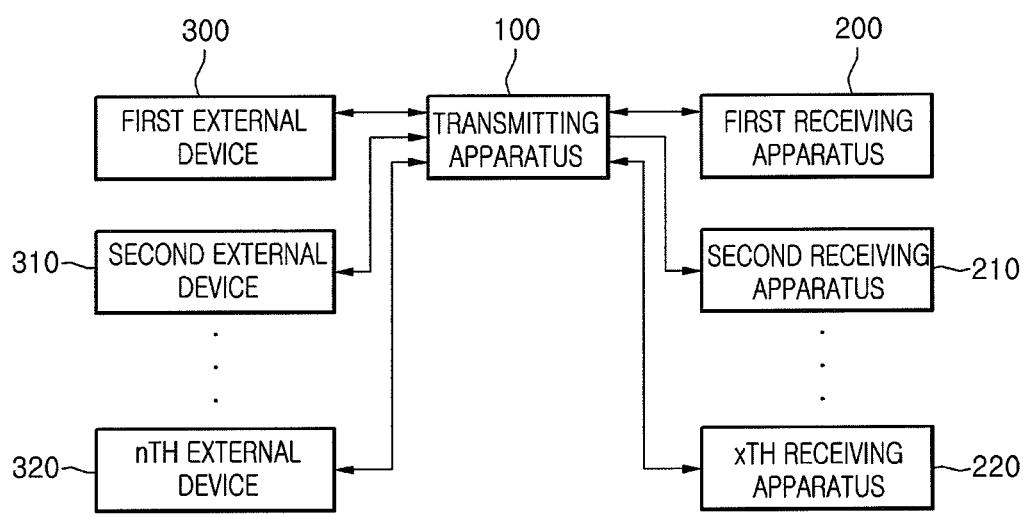
FIG. 16 is a block diagram illustrating a configuration of a transmitting/receiving system according to an embodiment of the present invention.

FIG. 16 is a block diagram illustrating a configuration of a transmitting/receiving system according to an embodiment of the present invention. In components of the transmitting/receiving system shown in FIG. 16, the same components as ones described by referring to FIGS. 1 to 15 will not be described below.

Referring to FIG. 16, the transmitting apparatus 100 may be connected to the plurality of receiving apparatuses 200, 210, and 220 by the wireless network. That is, the transmitting apparatus 100 converts the media signal received from at least one of the plurality of external devices 300, 310, and 320 into the wireless transmittable data and then, wirelessly transmits it at least one of to the plurality of receiving apparatuses 200, 210, and 220.

For example, the transmitting apparatus 100 may select one or more receiving apparatus to receive the media signal among the plurality of receiving apparatuses 200, 210, and 220 from the user and wirelessly transmit the media signal received from the outside to the receiving apparatus selected by the user.

For this, the transmitting apparatus 100 may include a plurality of wireless transmitting units (not shown) corresponding to each of the plurality of receiving apparatuses 200, 210, and 220 and each of the plurality of wireless transmitting units (not shown) may wirelessly transmit the video and audio data to the corresponding receiving apparatus.

Wireless communication protocols for transmitting and receiving data may be identical with each other or different from each other in each of the plurality of receiving apparatuses 200, 210, and 220. For example, the wireless communication protocols for each of the plurality of receiving apparatuses 200, 210, and 220 to receive data may be set to be different from each other according to the performance, installation position, etc. of each of the plurality of receiving apparatuses 200, 210, and 220.

Meanwhile, the transmitting apparatus 100 may include the number smaller than the number of the plurality of receiving apparatuses 200, 210, and 220, for example, one wireless transmitting unit (not shown). In this case, the transmitting apparatus 100 may wirelessly transmit data by using a multi-channel communication, that is, each of the plurality of receiving apparatuses 200, 210, and 220.

According to an embodiment of the present invention, each of the plurality of receiving apparatuses 200, 210, and 220 may receive the information on the external devices 300, 310, and 320 connected to the transmitting apparatus 100 from the transmitting apparatus 100.

Meanwhile, each of the receiving apparatuses 200, 210, and 220 may display the external input list that includes the information on the external devices 300, 301, and 320 connected to the transmitting apparatus 100 and the information on the external devices (not shown) connected to the receiving apparatus, by using the information on the received external devices 300, 310, and 320.

Therefore, the user may switch the external input of each receiving apparatus by using the external input list displayed in each of the receiving apparatuses 200, 210, and 220.

According to an embodiment of the present invention, the receiving apparatus receives the remote control signal for the external device connected to the transmitting apparatus and wireless transmits the received remote control signal to the transmitting apparatus to control the external device, such that the user of the receiving apparatus can control the external devices included in the transmitting/receiving system by the remote control device such as the remote controller, etc., thereby making it possible to improve the convenience of user.

In addition, a method for controlling an external device according to the present invention may be stored in a computer-readable recording medium by being produced as a program to be executed in a computer. An example of the computer-readable recording medium may include a ROM, a RAM, a CD-ROM, a magnetic tape, a floppy disk, an optical data storage, etc.

Further, the computer-readable recording media are distributed on computer systems connected through the network, and thus the computer-readable recording media may be stored and executed as the computer-readable code by a distribution scheme. Further, functional programs, codes, and code segments for implementing a method of receiving broadcast can be easily inferred by programmers in the related art.

Also, the devices described above may include one or more controllers to execute the methods described herein.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for controlling, by a display device, operations of at least one external device connected to a transmitting device, comprising:
   receiving, by the display device from the transmitting device, identification information on the at least one external device connected to the transmitting device;
   displaying an external input list by using the received identification information,
   wherein the external input list includes a first external input list including at least one icon corresponding to the at least one external device connected to the transmitting device and a second external input list including at least one icon corresponding to at least one external device connected to the display device, and
   wherein the first external input list and the second external input list are displayed differently from each other;
   generating a selection signal in response to a first user's input to select one device of the external input list; and
   performing a switch of an external input to the selected external device.

2. The method of claim 1, wherein the step of performing the switch comprises:
   when the selected external device is connected to the display device, receiving an output signal of the selected external device from the selected external device, and
   when the selected external device is connected to the transmitting device,
   transmitting identification information on the selected external device to the transmitting device; and
   receiving an output signal of the selected external device from the transmitting device.

3. The method of claim 2, wherein the steps of transmitting the identification information and receiving the output signal include transmitting and receiving via at least one of a wireless high-definition (WiHD) link, a wireless home digital interface (WHDi) link or a wireless LAN (WiFi) link.

4. The method of claim 1,
   wherein the at least one external device connected to the transmitting device includes at least one data relay or data storage device, and
   wherein the identification information includes at least one of
     information about the at least one external device connected to the transmitting device,
     contents of the at least one external device connected to the transmitting device,
     information about the contents of the at least one external device connected to the transmitting device,
     broadcast data received by the at least one external device connected to the transmitting device, and
     information about the broadcast data.

5. The method of claim 1, further comprising:
   receiving, in the display device, a second user's input to the displayed external input list,
   wherein the first and second user's inputs are one of an infrared signal, an RF signal, and an optical signal.

6. A display device configured to control operations of at least one external device connected to a transmitting device, comprising:
   a display;
   a remote control interface unit configured to wirelessly receive user inputs from a remote controller;
   a wireless communication unit configured to wirelessly communicate with the transmitting device; and
   a controller operatively connected to the display, the remote control interface unit and the wireless communication unit, the controller configured to
     wirelessly receive, from the transmitting device, identification information on the at least one external device connected to the transmitting device,
     display an external input list by using the received identification information,
     wherein the external input list includes a first external input list including at least one icon corresponding to the at least one external device connected to the transmitting device and a second external input list including at least one icon corresponding to at least one external device connected to the display device, and
     wherein the first external input list and the second external input list are displayed differently from each other,
     generate a selection signal in response to a first user's input to select one device of the external input list, and
     perform a switch of an external input to the selected external device.

7. The display device of claim 6,
   wherein, when the selected external device is connected to the display device, the controller is configured to receive an output signal of the selected external device from the selected external device, and
   wherein, when the selected external device is connected to the transmitting device, the controller is configured to
     transmit identification information on the selected external device to the transmitting device, and
     receive an output signal of the selected external device from the transmitting device.

8. The display device of claim 7, wherein the wireless communication unit is configured to communicate via at least one of a wireless high-definition (WiHD) link, a wireless home digital interface (WHDi) link or a wireless LAN (WiFi) link.

9. The display device of claim 6,
   wherein the at least one external device connected to the transmitting device includes at least one data relay or data storage device, and
   wherein the identification information includes at least one of
     information about the at least one external device connected to the transmitting device,
     contents of the at least one external device connected to the transmitting device,
     information about the contents of the at least one external device connected to the transmitting device,
     broadcast data received by the at least one external device connected to the transmitting device, and
     information about the broadcast data.

10. The display device of claim 6,
    wherein the controller configured to receive a second user's input to the displayed external input list for switching the external input, and wherein the first and second user's inputs are one of an infrared signal, an RF signal, and an optical signal.

11. A method for controlling, by a display device, operations of at least one external input of a transmitting device connected to the display device, comprising:
receiving, by the display device, a first input for displaying an external input list;
displaying, by the display device, the external input list in response to the first input, wherein the external input list includes a first external input list including at least one icon corresponding to at least one external device connected to the transmitting device and a second external input list including at least one icon corresponding to at least one external device connected to the display device, and
wherein the first external input list and the second external input list are displayed differently from each other;
receiving, by the display device, a second input for selecting an icon from the external input list; and
accessing, by the display device, an external input corresponding to the selected icon in response to the second input.

12. The method of claim 11, further comprising:
receiving, by the display device from the transmitting device, identification information on the at least one external input of the transmitting device,
wherein the at least one icon representing the at least one external input of the transmitting device is generated by using the received identification information.

13. The method of claim 12, wherein the step of receiving the identification information comprises receiving the identification information via at least one of wireless high-definition (WiHD), wireless home digital interface (WHDi) or wireless LAN (WiFi).

14. The method of claim 12, wherein the external input of the display device is received using an antenna, a high-definition multimedia interface (HDMI) terminal, a universal serial bus (USB) terminal, a component terminal, an external input terminal, an RGB terminal, or an antenna cable terminal.

15. A display device configured to control operations of at least external device connected to a transmitting device, comprising:
a display;
a remote control interface unit configured to wirelessly receive a user's input from a remote controller;
a wireless communication unit configured to wirelessly communicate with the transmitting device; and
a controller operatively connected to the display device, the remote control interface unit and the wireless communication unit, the controller configured to
receive a first input for displaying an external input list,
display the external input list in response to the first input, wherein the external input list includes a first external input list including at least one icon corresponding to the at least one external device connected to the transmitting device and a second external input list including at least one icon corresponding to at least one external device connected to the display device, and
wherein the first external input list and the second external input list are displayed differently from each other,
receive a second input for selecting an icon from the external input list, and
access an external input corresponding to the selected icon in response to the second input.

16. The display device of claim 15, wherein the wireless communication unit is further configured to receive identification information on the at least one external input of the transmitting device,
wherein the at least one icon representing the at least one external input of the transmitting device is generated by using the received identification information.

17. The display device of claim 16, wherein the wireless communication unit receives the identification information via at least one of wireless high-definition (WiHD), wireless home digital interface (WHDi) or wireless LAN (WiFi).

18. The display device of claim 16, wherein the external input of the display device is received using an antenna, a high-definition multimedia interface (HDMI) terminal, a universal serial bus (USB) terminal, a component terminal, an external input terminal, an RGB terminal, or an antenna cable terminal.

* * * * *